(12) United States Patent
Baig et al.

(10) Patent No.: US 11,370,556 B2
(45) Date of Patent: Jun. 28, 2022

(54) HYBRID ELECTRIC POWER DISTRIBUTION AND CONTROL FOR AN AIRCRAFT

(71) Applicant: United Technologies Corporation, Farmington, CT (US)

(72) Inventors: Zubair Ahmed Baig, South Windsor, CT (US); Sorin Bengea, Leuven (BE); Gary L. Miles, Stillman Valley, IL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 265 days.

(21) Appl. No.: 16/575,707

(22) Filed: Sep. 19, 2019

(65) Prior Publication Data

US 2021/0394916 A1 Dec. 23, 2021

Related U.S. Application Data

(63) Continuation-in-part of application No. 16/524,752, filed on Jul. 29, 2019.
(Continued)

(51) Int. Cl.
*B64D 33/00* (2006.01)
*B64D 31/00* (2006.01)
(Continued)

(52) U.S. Cl.
CPC ............ *B64D 33/00* (2013.01); *B64D 31/00* (2013.01); *H02J 4/00* (2013.01); *H02J 9/061* (2013.01)

(58) Field of Classification Search
CPC .. B64D 33/00; B64D 31/00; H02J 4/00; H02J 9/061
See application file for complete search history.

(56) References Cited

U.S. PATENT DOCUMENTS 7,786,620 B2 8/2010 Vuk et al.
7,872,368 B2 1/2011 Karimi et al.
(Continued)

OTHER PUBLICATIONS

EP Application No. 19189124.1 Extended EP Search Report dated Jan. 7, 2020, 9 pages.

*Primary Examiner* — Jared Fureman
*Assistant Examiner* — Michael J Warmflash
(74) *Attorney, Agent, or Firm* — Cantor Colburn LLP

(57) ABSTRACT

A power system of an aircraft includes a hybrid energy storage system with at least two energy storage subsystems each having a different power-energy density, power draw characteristics and/or dissimilar configuration. A primary power unit includes an aircraft engine coupled to an electric motor and a first generator. A secondary power unit is coupled to a second generator. A bidirectional power converter is coupled to the hybrid energy storage system and one or more controllers of the electric motor, the first generator, and the second generator. A power management controller is configured to interface with the hybrid energy storage system and the one or more controllers of the electric motor, the first generator, and the second generator and perform a model predictive control to dynamically adjust one or more electric power flows through the bidirectional power converter based on an engine propulsion power demand of the aircraft engine.

20 Claims, 6 Drawing Sheets

Related U.S. Application Data

(60) Provisional application No. 62/886,609, filed on Aug. 14, 2019, provisional application No. 62/711,855, filed on Jul. 30, 2018.

(51) Int. Cl.
*H02J 9/06* (2006.01)
*H02J 4/00* (2006.01)

(56) References Cited

U.S. PATENT DOCUMENTS

| | | |
|---|---|---|
| 8,296,036 B2 | 10/2012 | Matuszeski et al. |
| 8,384,343 B2 | 2/2013 | Kojori et al. |
| 8,963,365 B2 * | 2/2015 | King ................ B60L 58/20 307/64 |
| 9,840,997 B2 | 12/2017 | Dooley et al. |
| 9,873,518 B2 | 1/2018 | Sautreuil et al. |
| 10,081,350 B2 * | 9/2018 | Zhou ................ H02J 7/1423 |
| 10,128,662 B2 * | 11/2018 | Radun ................ H02J 9/06 |
| 2014/0084817 A1 | 3/2014 | Bhavaraju et al. |
| 2014/0260306 A1 * | 9/2014 | Dooley ........... F02N 11/0866 60/778 |
| 2014/0300307 A1 * | 10/2014 | Miles .............. G01R 31/34 318/494 |
| 2015/0367950 A1 * | 12/2015 | Rajashekara ....... F01D 7/02 903/930 |
| 2016/0204615 A1 * | 7/2016 | Radun ............. B64D 47/00 307/9.1 |
| 2017/0057363 A1 | 3/2017 | Huh et al. |
| 2017/0321608 A1 * | 11/2017 | Crowley ............ F02C 7/236 |
| 2018/0003109 A1 * | 1/2018 | Lents ............. B64D 27/10 |
| 2018/0300191 A1 * | 10/2018 | Bengea ........... G06F 11/0703 |
| 2019/0005826 A1 * | 1/2019 | Lax ................ G01C 21/20 |
| 2019/0063333 A1 * | 2/2019 | Bengea .............. G06F 9/455 |
| 2020/0031480 A1 * | 1/2020 | Baig ............... B60L 50/61 |
| 2020/0123926 A1 * | 4/2020 | Amari .............. F01D 25/00 |
| 2020/0248622 A1 * | 8/2020 | Crowley ............. G06N 3/08 |
| 2020/0347787 A1 * | 11/2020 | Crowley .......... B64D 27/02 |

\* cited by examiner

HYBRID ELECTRIC POWER DISTRIBUTION AND CONTROL FOR AN AIRCRAFT

CROSS-REFERENCE TO RELATED APPLICATIONS

This application claims the benefit of priority to U.S. Provisional Application No. 62/886,609 filed Aug. 14, 2019, this application is a continuation-in-part of U.S. patent application Ser. No. 16/524,752 filed on Jul. 29, 2019, which claims the benefit of priority to U.S. Provisional Application No. 62/711,855 filed Jul. 30, 2018, the disclosures of which are incorporated herein by reference in their entirety.

BACKGROUND

Exemplary embodiments pertain to aircraft systems, and more particularly to systems and methods of controlling a hybrid electric power distribution for an aircraft.

Aircraft, such as those utilized by commercial airlines, typically include two or more gas turbine engines. The engines generate thrust, propelling the aircraft forward and allowing operation of the aircraft. A typical engine utilized in this configuration includes a fan forward of a turbine engine core, with the turbine engine core driving the rotation of the fan either via a direct drive system or a geared connection. Some aircraft propulsion systems also include one or more electric motors and/or generators to provide a supplemental power source under certain aircraft operating conditions.

BRIEF DESCRIPTION

Disclosed is a power system of an aircraft, where the power system includes a hybrid energy storage system with at least two energy storage subsystems each having a different power-energy density, power draw characteristics and/or dissimilar configuration. The power system also includes a primary power unit including an aircraft engine coupled to an electric motor and a first generator, and a secondary power unit coupled to a second generator. The power system also includes a bidirectional power converter coupled to the hybrid energy storage system and one or more controllers of the electric motor, the first generator, and the second generator. A power management controller is configured to interface with the hybrid energy storage system and the one or more controllers of the electric motor, the first generator, and the second generator and perform a model predictive control to dynamically adjust one or more electric power flows through the bidirectional power converter based on an engine propulsion power demand of the aircraft engine.

In addition to one or more of the features described above or below, or as an alternative, further embodiments may include where the power management controller is operable to detect one or more conditions of the at least two energy storage subsystems and configure the one or more electric power flows.

In addition to one or more of the features described above or below, or as an alternative, further embodiments may include where the power management controller is operable to configure at least one of the one or more electric power flows from a first energy storage subsystem of the at least two energy storage subsystems to charge a second energy storage subsystem of the at least two energy storage subsystems.

In addition to one or more of the features described above or below, or as an alternative, further embodiments may include where the first energy storage subsystem includes a battery system and a battery management system, the second energy storage subsystem includes a super/ultra-capacitor, and the bidirectional power converter is operably coupled to the super/ultra-capacitor and the battery management system.

In addition to one or more of the features described above or below, or as an alternative, further embodiments may include where the hybrid energy storage system includes a third energy storage system with an isolated battery pack accessible by the power management controller based on determining that a mode of operation of the aircraft is a ground-based mode of operation or an emergency power mode of operation.

In addition to one or more of the features described above or below, or as an alternative, further embodiments may include where a plurality of aircraft electrical subsystems is operably coupled to the bidirectional power converter and the power management controller is configured to extract power from or provide power to the aircraft electrical subsystems, and the model predictive control can be further based on one or more aircraft subsystem power demands.

In addition to one or more of the features described above or below, or as an alternative, further embodiments may include where the aircraft electrical subsystems include one or more of an engine subsystem, an aircraft low-voltage DC subsystem, an aircraft high-voltage DC subsystem, and an aircraft AC subsystem.

In addition to one or more of the features described above or below, or as an alternative, further embodiments may include where the power management controller is operable to monitor a state of charge of the hybrid energy storage system, a power request of an engine subsystem control of the engine subsystem, an aircraft subsystem control, and the one or more controllers of the electric motor, the first generator, and the second generator.

In addition to one or more of the features described above or below, or as an alternative, further embodiments may include where the power management controller is operable to determine a current status and constraints from the engine subsystem control, the aircraft subsystem control, and the one or more controllers of the electric motor, the first generator, and the second generator. The engine propulsion power demand and data from a plurality of engine sensors can be received. A plurality of desired values can be determined for electrical power levels. The desired values for electrical power levels can be communicated to the engine subsystem control, the aircraft subsystem control, and the one or more controllers of the electric motor, the first generator, and the second generator.

In addition to one or more of the features described above or below, or as an alternative, further embodiments may include where the model predictive control determines the electrical power levels by computing a plurality of future step values using a plurality of dynamic equations that model a plurality of subsystems, the current status and constraints, and an objective function based on an error between a requested and an allocation power level or thrust.

Also disclosed is a method that includes interfacing a power management controller with a hybrid energy storage system and one or more controllers of an electric motor, a first generator, and a second generator, where the hybrid energy storage system includes at least two energy storage subsystems each having a different power-energy density and power draw characteristics, and the electric motor and the first generator are coupled to an aircraft engine of a primary power unit and the second generator is coupled to a secondary power unit. The power management controller receives an engine propulsion power demand for the aircraft engine. A model predictive control is performed to dynamically adjust one or more electric power flows through a bidirectional power converter based on the engine propulsion power demand, where the bidirectional power converter is coupled to the hybrid energy storage system and one or more controllers of the electric motor, the first generator, and the second generator.

In addition to one or more of the features described above or below, or as an alternative, further embodiments may include detecting one or more conditions of the at least two energy storage subsystems, and configuring the one or more electric power flows based on the one or more conditions of the at least two energy storage subsystems.

In addition to one or more of the features described above or below, or as an alternative, further embodiments may include configuring at least one of the one or more electric power flows from a first energy storage subsystem of the at least two energy storage subsystems to charge a second energy storage subsystem of the at least two energy storage subsystems.

In addition to one or more of the features described above or below, or as an alternative, further embodiments may include determining a current status and constraints from the engine subsystem control, the aircraft subsystem control, and the one or more controllers of the electric motor, the first generator, and the second generator; receiving the engine propulsion power demand and data from a plurality of engine sensors; determining a plurality of desired values for electrical power levels; and communicating the desired values for electrical power levels to the engine subsystem control, the aircraft subsystem control, and the one or more controllers of the electric motor, the first generator, and the second generator.

In addition to one or more of the features described above or below, or as an alternative, further embodiments may include determining the electrical power levels by computing a plurality of future step values using a plurality of dynamic equations that model a plurality of subsystems, the current status and constraints, historical energy consumption, and an objective function based on an error between a requested and an allocation power level or thrust.

A technical effect of systems and methods is achieved by providing hybrid electric power distribution for an aircraft as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
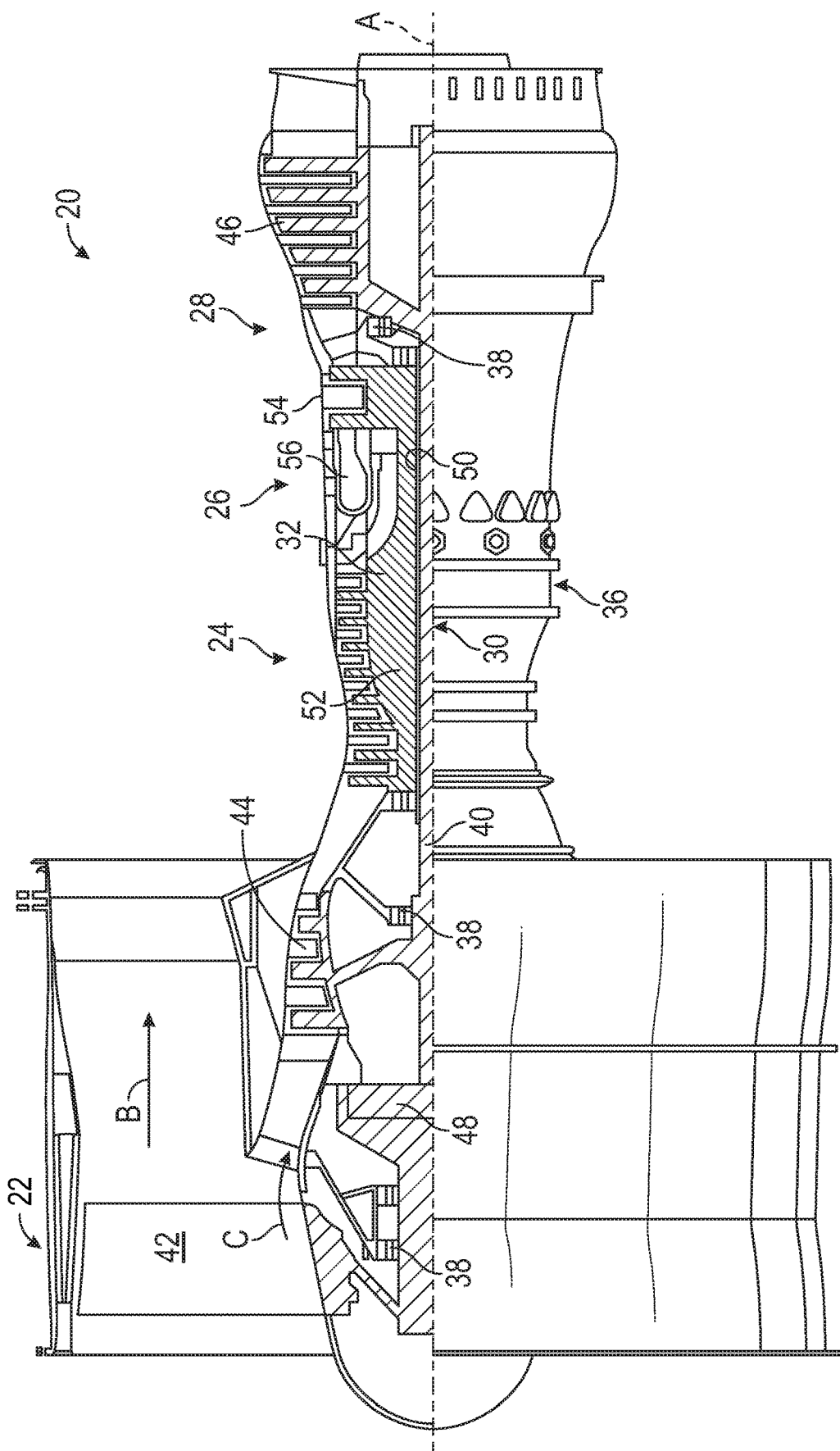
FIG. 1 is a schematic illustration of a gas turbine engine in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7 °R)]^0.5. The "Low corrected fan tip speed" as disclosed herein according to one non-limiting embodiment is less than about 1150 ft/second (350.5 m/sec).

Figure 2:
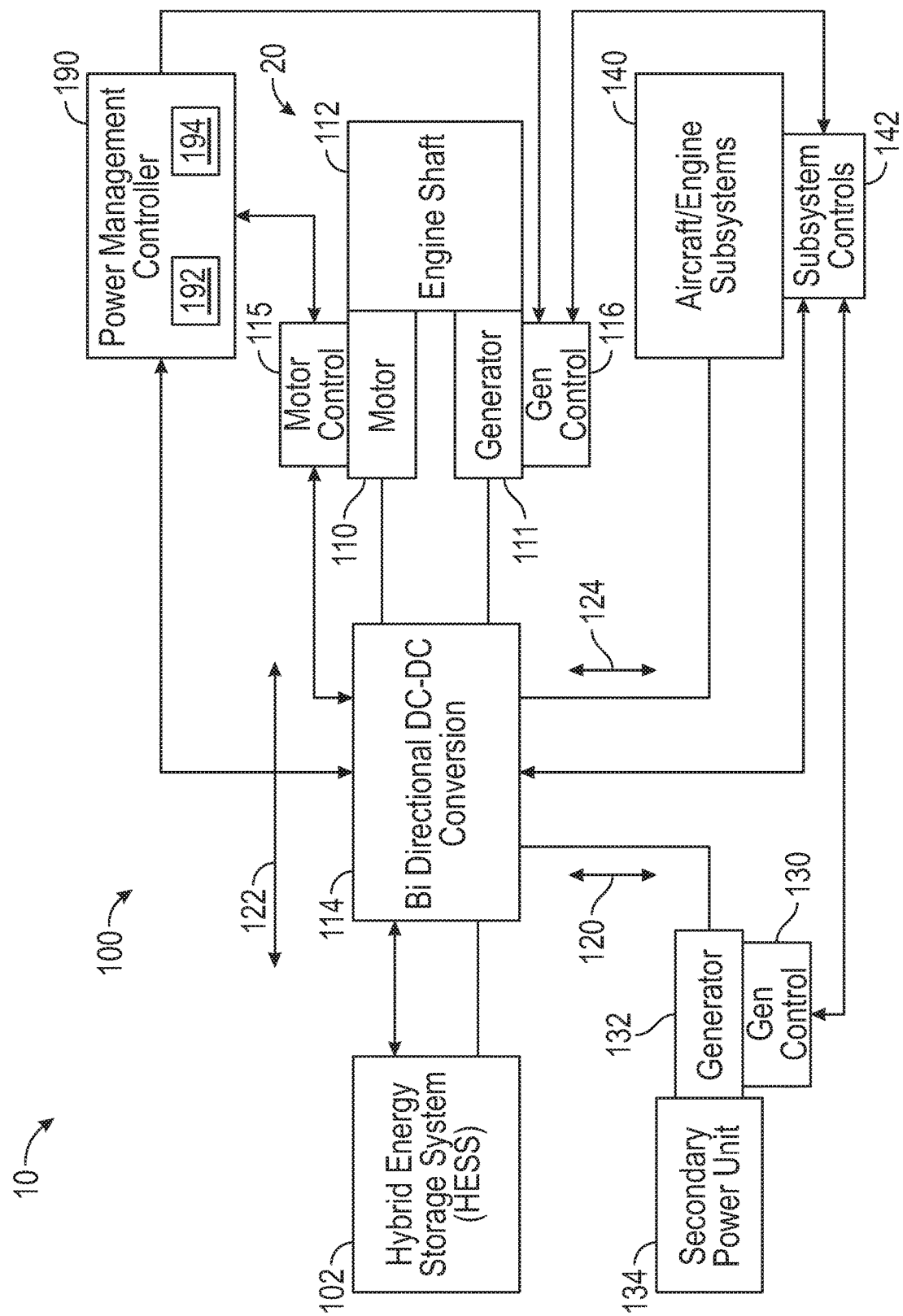
FIG. 2 is a schematic illustration of a power system in accordance with an embodiment of the disclosure.
Figure 3:
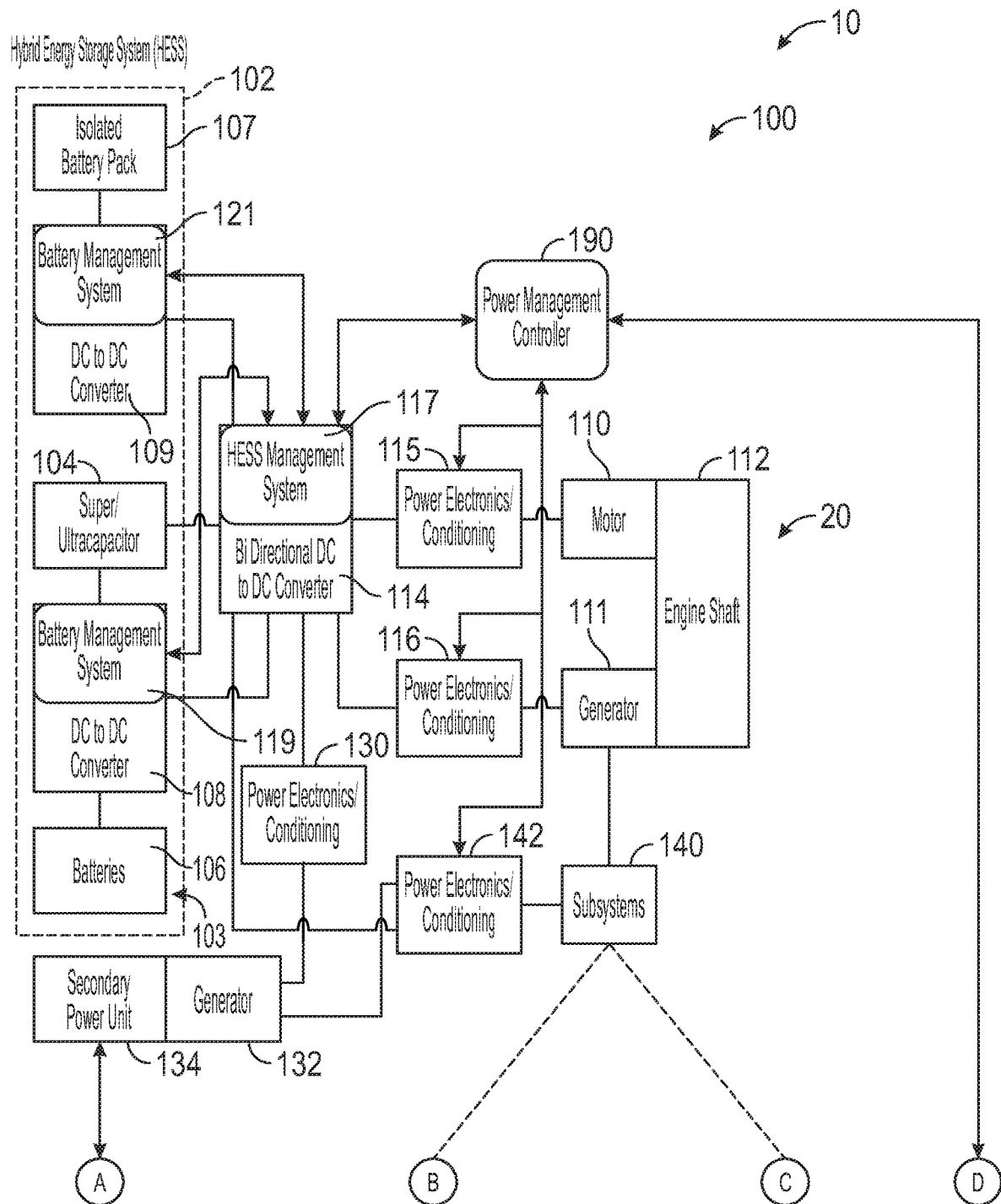
FIG. 3 is a schematic illustration of the power system of FIG. 2 in greater detail in accordance with an embodiment of the disclosure.
Figure 3:
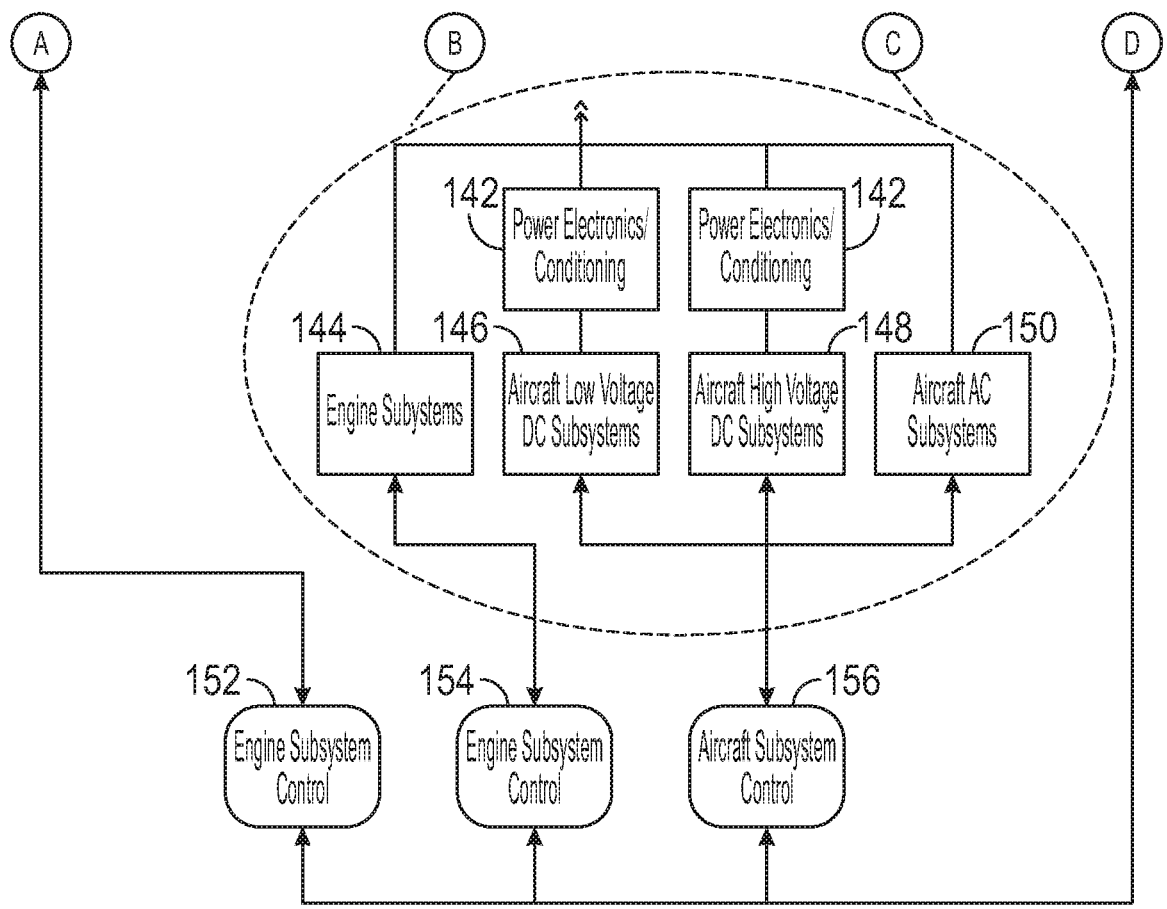

FIGS. 2 and 3 depict a power system 100 of an aircraft 10 that includes the gas turbine engine 20 of FIG. 1 (also referred to generally as an aircraft engine) according to an embodiment. The power system 100 can include a hybrid energy storage system 102 with at least two energy storage subsystems 103 (FIG. 4) each having a different power-energy density, power draw characteristics and/or dissimilar configuration/architecture to meet various types of power demands and fault protection with backup power sources. In the example of FIG. 3, the at least two energy storage subsystems 103 include a super/ultra-capacitor 104 and a battery system 106. The hybrid energy storage system 102 may be sized to store energy to support transient bursts of the gas turbine engine 20 for a power assist during a snap acceleration or power shedding during a snap deceleration. Using only the battery system 106 for a wide range of acceleration and deceleration conditions may result in over-sizing battery capacity with corresponding additional weight carried to meet potential transient demands. The super/ultra-capacitor 104 provides a lower storage capacity than the battery system 106 but has a higher charge/discharge rate as compared to the battery system 106. The super/ultra-capacitor 104 can be comprised of one or more electrochemical double layer capacitors (EDLCs) or electrochemical capacitors that have a high energy density when compared to common capacitors, e.g., several orders of magnitude greater than a high-capacity electrolytic capacitor. The super/ultra-capacitor 104 can have higher energy efficiency due to a lower internal resistance than the battery system 106. The super/ultra-capacitor 104 can be operatively coupled to the battery system 106 through a direct current (DC)-to-DC converter 108. The DC-to-DC converter 108 can convert a voltage level of the battery system 106 to match a voltage level of the super/ultra-capacitor 104 to support charging of the super/ultra-capacitor 104 by the battery system 106. In alternate embodiments, the DC-to-DC converter 108 can be omitted where regulation between the super/ultra-capacitor 104 and the battery system 106 is not needed.

The battery system 106 is an example of a first energy storage subsystem, and the super/ultra-capacitor 104 is an example of a second energy storage system. The hybrid energy storage system 102 can also include a third energy storage system that includes an isolated battery pack 107 accessible by the power management controller 109 based on determining that a mode of operation of the aircraft 10 is a ground-based mode of operation or an emergency power mode of operation. The emergency power mode can use the isolated battery pack 109 to provide power through a DC-to-DC converter 109 to other elements of the power system 100, for instance, in place of a ram-air turbine.

In embodiments, an electric motor 110 and a first generator 111 are operably coupled to at least one shaft 112 of an aircraft engine, such as the inner shaft 40 of low speed spool 30 or the outer shaft 50 of high speed spool 32 of the gas turbine engine 20 of FIG. 1, which may also be referred to as a primary power unit. In the example of FIGS. 2 and 3, the hybrid energy storage system 102 is operably coupled to a bidirectional power converter 114 (e.g., a bidirectional DC-to-DC converter) which is operably coupled to a motor controller 115 (also referred to as power conditioning electronics 115) and a first generator controller 116 (also referred to as power conditioning electronics 116). The motor controller 115 interfaces with the electric motor 110, and the first generator controller 116 interfaces with the first generator 111. The bidirectional power converter 114 also interfaces with the power management controller 190, for instance, through a hybrid energy storage system management system 117 of the bidirectional power converter 114. Further, the bidirectional power converter 114 can interface with a second generator controller 130 (also referred to as power conditioning electronics 130) of a second generator 132 of a secondary power unit 134. The secondary power unit 134 can be a heat engine or any type of power generating device operable to drive rotation of the second generator 132. A plurality of aircraft electrical subsystems 140 is operably coupled to the bidirectional power converter 114, and the power management controller 190 is configured to extract power from or provide power to the aircraft electrical subsystems 140 through subsystem controls 142 (also referred to as power conditioning electronics 142). The aircraft electrical subsystems 140 can include one or more of an engine subsystem 144, an aircraft low-voltage DC subsystem 146, an aircraft high-voltage DC subsystem 148, and an aircraft AC subsystem 150. The power management controller 190 is operable to monitor a state of charge of the hybrid energy storage system 102, a power request of an engine subsystem control 152 of the secondary power unit 134, an engine subsystem control 154 of the engine subsystem 144, an aircraft subsystem control 156, and the one or more controllers 115, 116, 130 of the electric motor 115, the first generator 111, and the second generator 132.

The bidirectional power converter 114 can perform any voltage conversions needed between elements of the power system 100. Although only one bidirectional power converter 114 is depicted, it will be understood that multiple bidirectional power converters can be incorporated in the power system 100 and that reference to the bidirectional power converter 114 can include one or more bidirectional power converters within the power system 100. The power conditioning electronics 115, 116, 130, 142 can include inverter/motor drive circuitry that applies known motor control techniques to control the speed and/or torque produced by one or more of the electric motor 110, first generator 111, and second generator 132. For example, during a snap acceleration, electric power from the hybrid energy storage system 102 is provided through the bidirectional power converter 114 and the power conditioning electronics 115 to drive the electric motor 110 in a motor mode to supplement rotation of the engine shaft 112 as opposed by an engine load. The engine load on the engine shaft 112 can vary depending upon a flight regime and accessory loading from generators, environmental control systems, engine bleeds, and other known loading factors. During a snap deceleration, the first generator 111 can be used to increase the engine load on the engine shaft 112, with resulting current passed through the bidirectional power converter 114 for storage in the hybrid energy storage system 102 or used elsewhere within the power system 100. The hybrid energy storage system management system 117 of the bidirectional power converter 114 can be operably coupled to a battery management system 119 of the DC-to-DC converter 108 and/or to a battery management system 121 to control and manage the battery system 106 and isolated battery pack 107 respectively. The battery management systems 119, 121 can provide local status information such as a state of charge or health of the battery system 106 and isolated battery pack 107. Isolation can prevent the isolated battery pack 107 from being drained in unintended modes of operation.

In embodiments, the power management controller 190 can provide a means for controlling one or more electric power flows of the hybrid energy storage system 102 to/from the one or more electric motor 110, first generator 111, second generator 132, and aircraft electrical subsystems 140 based on a modeled electric power demand of an engine load of the aircraft engine that may be at a current time step or predicted at one or more future time steps, for example. The power management controller 190 (also referred to as controller 190) is operable to detect one or more conditions of the super/ultra-capacitor 104 and the battery system 106 and configure the one or more electric power flows between the hybrid energy storage system 102 and other elements of the power system 100. Detectable conditions can include a current charge level, a remaining storage capacity, health/fault status, and other such information. Further, the conditions may be derived based on environmental factors, previous usage data or aging effects. For example, if a temperature of the battery system 106 impacts the storage capacity and/or charge/discharge rate, then such information can be determined in assessing the condition of the battery system 106.

The power management controller 190 can interface with and control multiple elements of the power system 100 and the gas turbine engine 20, such as switches, current sensors, voltage sensors, temperature sensors, communication buses, and the like. In an embodiment, the power management controller 190 includes a memory system 192 to store instructions that are executed by a processing system 194 of the power management controller 190. The executable instructions may be stored or organized in any manner and at any level of abstraction, such as in connection with a controlling and/or monitoring operation of the power system 100 and/or the gas turbine engine 20. The processing system 194 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 192 may include random access memory (RAM), read only memory (ROM), or other electronic, optical, magnetic, or any other computer readable medium onto which is stored data and control algorithms in a non-transitory form. Other controllers of FIGS. 2 and 3 can include similar elements.

Various electric power flows 120, 122, 124 can be bidirectionally controlled to shift energy between elements of the power system 100. Selection and timing for engaging the various electric power flows 120-124 can be controlled by the power management controller 190. As one example, the power management controller 190 may be implemented as a predictive controller or other model-based control as further described in reference to FIG. 4.

Figure 4:
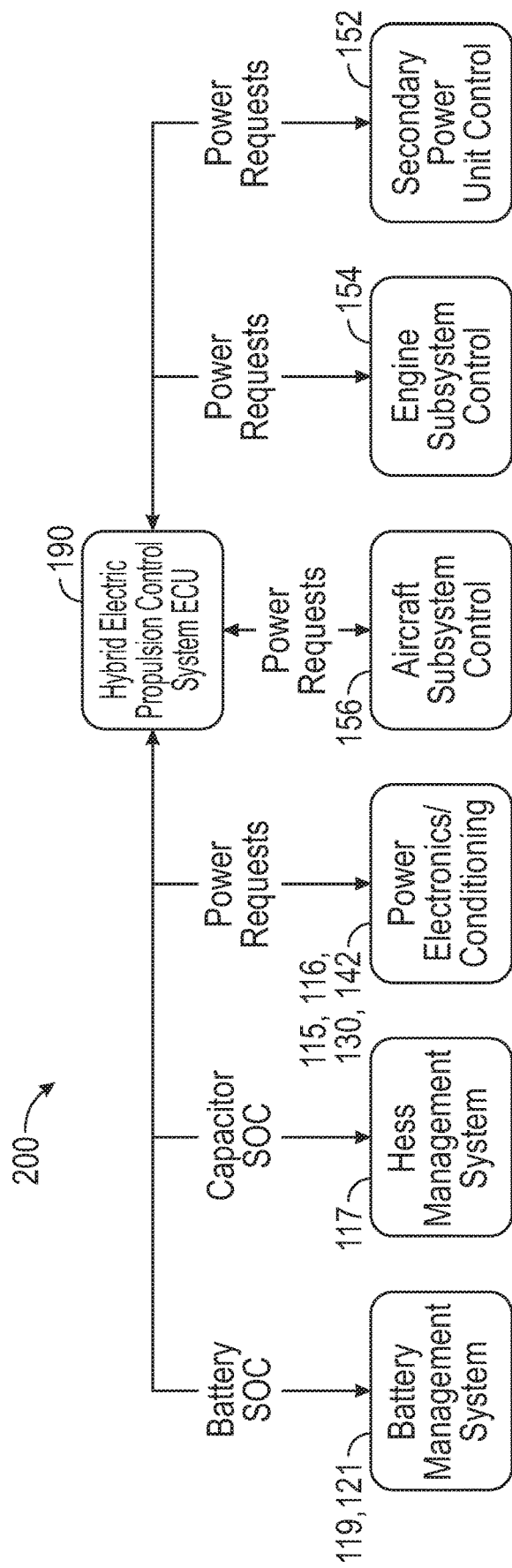
FIG. 4 is a schematic illustration of a control system in accordance with an embodiment of the disclosure.

In the example of FIG. 4 with continued reference to FIGS. 1-3, a control system 200 of the power system 100 can include the power management controller 190 includes a model-based control, such as a model predictive control, operable to output one or more electric power flow control signals. Predictive power management can include dynamically reading status of each of the power source and predicting what loads will be required to proactively optimize power flows, such as closing contactors predictively to enable an optimal power flow with reduced delays. As an example, a delay between requesting power and delivering power can exist where contactors or other components have a switching or settling time delay. By predictively closing contactors or commanding other such state changes prior to a needed delivery of power, system responsiveness can be enhanced. The power management controller 190 can include models with maps, equations, and the like that relate voltage, current, electrical power, and state-of-charge, for example. The system-level control algorithm integrates the models associated with each subsystem and includes their respective constraints. The electric motor(s) can be modeled as $T_{motor}=F_{motor}(I_{phase}, V, N_{shaft})$ where the function can be an equation, a look-up table, a map that relates the currents in all the motor phases, the voltage, and the shaft rotational speed to generated motor torque. Several constraints are defined and included in the overall control problem definition. These are related to motor torque, $T_{motor, min} \leq T_{motor} \leq T_{motor, max}$, shaft angular speed, $N_{shaft, min} \leq N_{shaft} \leq N_{shaft, max}$. Similarly, a model $F_{generator}(I_{phase}, V, N_{shaft})$ and constraints $T_{generator, min} \leq T_{generator} \leq T_{generator, max}$ are defined for the generator(s). Additional parameters can also be incorporated in motor torque modeling, such as loads, back-electromagnetic field effects, and other such electrical and mechanical parameters. The phase currents that control the motor torque can be generated by a motor drive/inverter and related to the direct current through another set of equations, $I_{phase}=F_{inv}(V, I_{DC}, N_{shaft})$, where $F_{inv}$ could be a set of equations, maps or look-up tables. The direct current, $I_{DC}$, depends upon the current provided by the ultra-capacitor or supercapacitor $I_{DC, UC}$ and/or the current supplied by the batteries, $I_{DC, Bat}$, and needs to be bounded $I_{DC, min} \leq I_{DC} \leq I_{DC, max}$ (with the positive upper bound active during discharging, and the negative, lower bound active during charging). Each of the current depends on the state-of-charge and state-of-health of the ultra-capacitor and battery system, $I_{DC,UC}=F_{I,UC}(SOC_{UC}, V, mode)$ and $I_{DC,bat}=F_{I,Bat}(SOC_{Bat}, V, mode)$. The state-of-charge and state-of-health are dynamical states that are interrelated and depend on the current supplied by each storage subsystem. Because they have different dynamics depending on whether they are charging or discharging the functions that relate current, SOC, SOH are specific to each mode of operation. In order to ensure that the batteries continue to operate correctly for many charging-discharging cycles, the two key parameters are bounded: $SOC_{Bat,min} \leq SOC_{Bat} \leq SOC_{Bat,max}$ and $SOH_{Bat,min} \leq SOH_{Bat}$. All the models mentioned above and their associated constraints are lumped into an integrated, dynamical system-level model $dX_{Sys}=F_{sys}(X_{Sys}, mode)$ and constraints $X_{Sys, min} \leq X_{Sys} \leq X_{Sys,max}$. The objective in controlling the hybrid energy storage system is to meet the requested shaft torque; a cost function that penalizes the errors between the motor torque $T_{Motor}$ and the requested shaft torque $T_{Shaft,Req}$ can be used $\int [T_{Motor}(t) - T_{Shaft,Req}(t)]dt$, where the integral is calculated at each time step over a receding horizon [0, Dt], assuming that the requested motor torque is known over this time interval. The motor torque request can be set based on various external conditions such as: shaft speed and acceleration; overall system operating condition. The optimization problem including the defined cost function, system dynamics and constraints has as control inputs the current supplied by the battery system and modes of operation (charging, discharging) for each subsystem, and it is therefore a mixed-integer programming problem which can be solved numerically by using customized solvers. Additionally, monitoring input power and integrating over time to obtain energy consumption provides a high-level monitor on battery or super/ultra-capacitor capacity consumed as a model input for continuing power draw or charging functions.

Elements such as the super/ultra-capacitor 104 can be modeled using observed conditions and a physics-based model that incorporates sizing parameters, for example, to determine predicted charge time, discharge time, capacity, available charge, and other such information. Similarly, the battery system 106 and/or isolated battery pack 107 of FIG. 2 can be modeled using observed conditions and a physics-based model that incorporates sizing parameters, for example, to determine predicted charge time, discharge time, capacity, available charge, and other such information. An engine system model may model an engine load on the engine shaft 112 presently and at one or more future time steps. The engine system model may receive engine parameters from an engine control or flight computer system (not depicted) that assist with load predictions. The load predictions can include flight regime (e.g., idle, takeoff, climb, cruise, decent, thrust reverse, etc.) along with demands due to known loads and operating status of other propulsion system elements (e.g., operational status of other engines on the aircraft). The power flow control signals can control switching states and times of elements within the power system 100.

As one example, at each computational time step, the model-based control receives information about current engine loading and an engine load over one or more future time steps from the engine system model. The model-based control can access the super/ultra-capacitor model and the battery system model with corresponding power constraints to determine power profiles for the super/ultra-capacitor 104 and the battery system 106 and/or isolated battery pack 107 such that a power demand is met. Constraints can include healthy values, rates, and/or ranges for associated parameters. For instance, if a power demand exceeds the modeled capability of the battery system 106, then electric power can be provided by the super/ultra-capacitor 104. After the super/ultra-capacitor 104 is discharged, the power management controller 190 can perform recharging from the battery system 106. As another example, the power demand can be initially met by the battery system 106, but upon exceeding the power demand provided by battery system 106, additional power can be provided by the super/ultra-capacitor 104 via the second electric power flow 122. In some embodiments, time-based analysis selects either or both of the super/ultra-capacitor 104 and the battery system 106, for instance, by determining current demand and charge/discharge rates and capacity.

Examples of equations, limits and constraints that can be implemented in embodiments include the follow:

$$\min_{W_f, T_{m1}, T_{m2}, T_{g1}, T_{g2}, VV_{LPC}, VV_{HPC}} \int_{t_0}^{t_0+T} \{w_1 \cdot (Thrust_{Ref} - Thrust_{HEP})^2 +$$

$$w_2 \cdot W_f + w_3 \cdot Life_{Index} + w_4 \cdot (PR_{HPC,Ref} - PR_{HPC})^2\}$$

Subject to Limit Constraints $W_{f,min} \leq W_f \leq W_{f,max}; \dot{W}_{f,min} \leq \dot{W}_f \leq \dot{W}_{f,max}$ $T_{m1,min} \leq T_{m1} \leq T_{m1,max}; \dot{T}_{m1,min} \leq \dot{T}_{m1} \leq \dot{T}_{m1,max}$ $P_{Bat,min} \leq P_{Bat} \leq P_{bat,min} \leq SOC_{Bat} \leq SOC_{Bat,max}$ $P_{UC,min} \leq P_{UC} \leq P_{UC,max}; SOC_{UC,min} \leq SOC_{UC} \leq SOC_{UC,max}$ $PR_{HPC} \leq PR_{HPC,max}(W_{c,HPC}); PR_{LPC} \leq PR_{LPC,max}(W_{c,LPC});$ and similarly for all other effectors
Subject to Model Constraints $\dot{x}_{Eng} = F_{Eng}(x_{Eng}, W_f, T_{m1}, T_{m2}, T_{g1}, T_{g2}, VV_{LPC}, VV_{HPC})$ $T_{m1} = F_{m1}(x_{M1}, P_{E,m1}) \ P_{E,g1} = F_{g1}(x_{g1}, T_{g1})$ $T_{m2} = F_{m2}(x_{M2}, P_{E,m2}) \ P_{E,g2} = F_{g2}(x_{g2}, T_{g2})$ This is an example of a finite-horizon optimization objective function, where the solution to the problem is $[W_f, T_{m1}, T_{m2}, T_{g1}, T_{g2}, VV_{LPC}, VV_{HPC}]$, which provides a minimal value of the integral expression if the effector choices are used over a $t_0+T$ time horizon. The T values under the min statement and in the constraints can represent torque values. Using torque from an electrical system can enable integration synergistically with a control for an electrical powertrain based on torque-current relationships. $W_f$ can be a fuel flow. VV can be variable vane values (e.g., vane positions for low pressure compressor (LPC) and high pressure compressor (HPC)). Constraints can include power (P), pressure ratio (PR), state of charge (SOC), temperatures, motor parameters (m1, m2), component life, weights (w1, w2, w3, w4), and other such factors.

Figure 5:
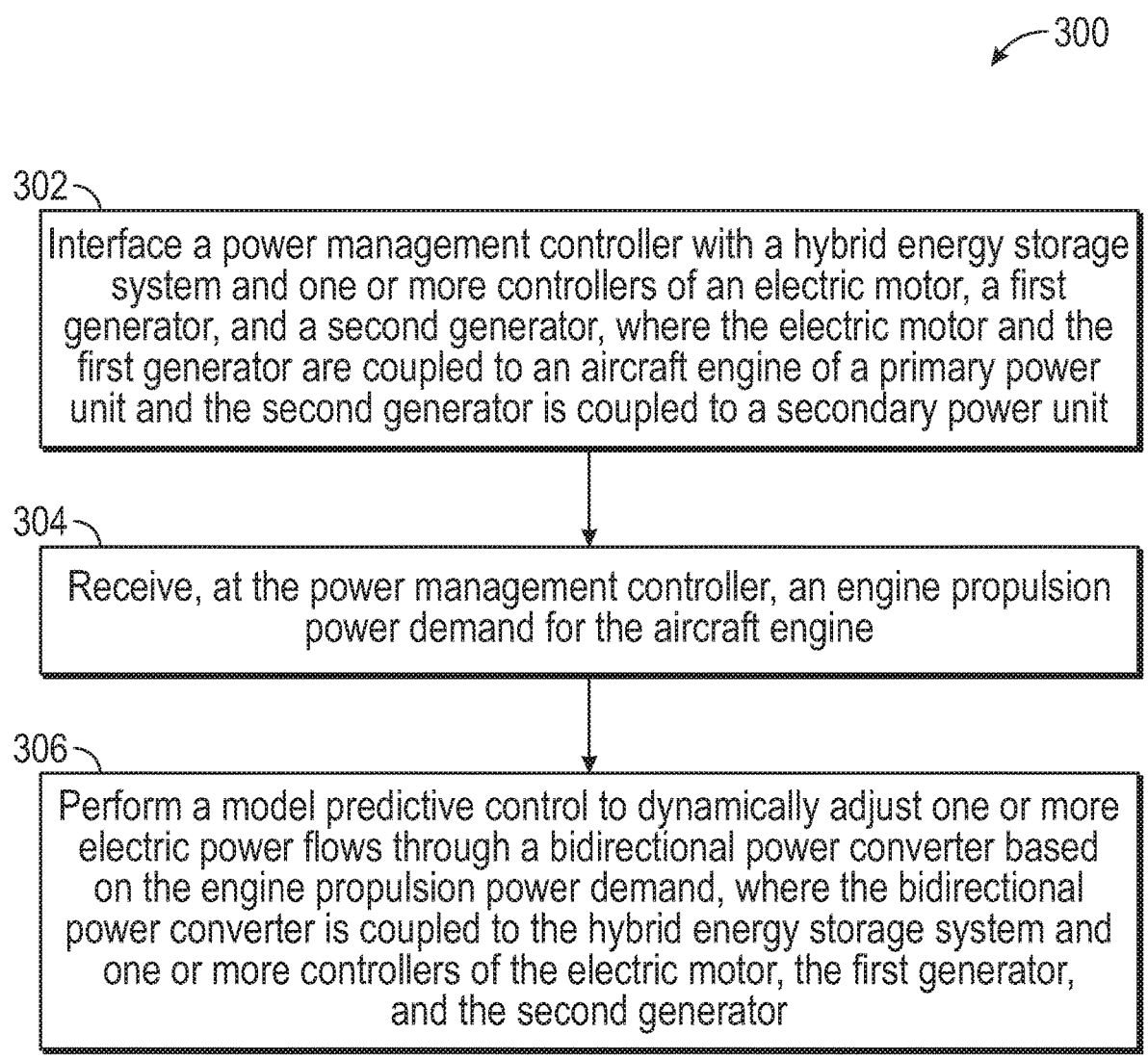
FIG. 5 is a flow chart illustrating a method in accordance with an embodiment of the disclosure.

FIG. 5 is a flow chart illustrating a method 300 of controlling a power system 100 of an aircraft 10 in accordance with an embodiment. The method 300 of FIG. 5 is described in reference to FIGS. 1-5 and may be performed with an alternate order and include additional steps. The method 300 can be performed, for example, by the power system 100 of FIGS. 2-3 or an alternate configuration.

At block 302, power management controller 190 can interface with a hybrid energy storage system 102 and one or more controllers 115, 116, 130 of an electric motor 110, a first generator 111, and a second generator 132, where the hybrid energy storage system 102 includes at least two energy storage subsystems 103 each having a different power-energy density, and the electric motor 110 and the first generator 111 are coupled to an aircraft engine 20 of a primary power unit and the second generator 132 is coupled to a secondary power unit 134. At block 304, power management controller 190 can receive an engine propulsion power demand for the aircraft engine 20. At block 306, the power management controller 190 can perform a model predictive control to dynamically adjust one or more electric power flows 120-124 through a bidirectional power converter 114 based on the engine propulsion power demand, where the bidirectional power converter 114 is coupled to the hybrid energy storage system 102 and one or more controllers 115, 116, 130 of the electric motor 110, the first generator 111, and the second generator 132.

In embodiments, the power management controller 190 can detect one or more conditions of the at least two energy storage subsystems 103, such as the super/ultra-capacitor 104 and the battery system 106 and configure the one or more electric power flows 120-124 based on the one or more conditions of the super/ultra-capacitor 104 and the battery system 106. For example, the power management controller 190 can configure at least one of the one or more electric power flows 120-124 from a first energy storage subsystem of the at least two energy storage subsystems 103 to charge a second energy storage subsystem of the at least two energy storage subsystem 103, such as from the battery system 106 through a DC-to-DC converter 108 to charge the super/ultra-capacitor 104. The hybrid energy storage system 102 can include a third energy storage system having an isolated battery pack 107 accessible by the power management controller 190 based on determining that a mode of operation of the aircraft is a ground-based mode of operation or an emergency power mode of operation. Limiting availability to access power of the isolated battery pack 107 to certain operating conditions ensures that power is available after mission completion (e.g., e-taxi on ground) or if needed in an emergency where other electrical power is lost. A plurality of aircraft electrical subsystems 140 can be operably coupled to the bidirectional power converter 114, and the power management controller 190 can be configured to extract power from or provide power to the aircraft electrical subsystems 140. The aircraft electrical subsystems 140 can include one or more of an engine subsystem 144, an aircraft low-voltage DC subsystem 146, an aircraft high-voltage DC subsystem 148, and an aircraft AC subsystem 150. In embodiments, model predictive control can be based on one or more aircraft subsystem power demands of the aircraft electrical subsystems 140. The power management controller 190 can be operable to monitor a state of charge of the hybrid energy storage system 102, a power request of an engine subsystem control 154 of the engine subsystem 144, an aircraft subsystem control 154, and the one or more controllers 115, 116, 130 of the electric motor 110, the first generator 111, and the second generator 132.

In some embodiments, the power management controller 190 is operable to determine a current status and constraints from the engine subsystem control 154, the aircraft subsystem control 156, and the one or more controllers 115, 116, 130 of the electric motor 110, the first generator 111, and the second generator 132. The power management controller 190 can receive the engine propulsion power demand and data from a plurality of engine sensors and determine a plurality of desired values for electrical power levels. The power management controller 190 can communicate the desired values for electrical power levels to the engine subsystem control 154, the aircraft subsystem control 156, and the one or more controllers of the electric motor, the first generator, and the second generator. The model predictive control 190 can determine the electrical power levels by computing a plurality of future step values using a plurality of dynamic equations that model a plurality of subsystems, the current status and constraints, and an objective function based on an error between a requested and an allocation power level or thrust.

In some embodiments, the power management controller 190 is operable to predictively switch horsepower extractions from the gas turbine engine 20 to source power from the hybrid energy storage system 102 instead of the gas turbine engine 20. Power transfers may be achieved by one or more automatic bus transfers (ABT). Further, if additional bus power is needed, an uninterruptable power supply (UPS) may be used to enhance electric bus stiffness.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power system of an aircraft, the power system comprising:
    a hybrid energy storage system comprising at least two energy storage subsystems each having a different power-energy density, power draw characteristics and/or dissimilar configuration;
    a primary power unit comprising an aircraft engine coupled to an electric motor and a first generator;
    a secondary power unit coupled to a second generator;
    a bidirectional power converter coupled to the hybrid energy storage system and one or more controllers of the electric motor, the first generator, and the second generator; and
    a power management controller configured to interface with the hybrid energy storage system and the one or more controllers of the electric motor, the first generator, and the second generator and perform a model predictive control to dynamically adjust one or more electric power flows through the bidirectional power converter based on an engine propulsion power demand of the aircraft engine and perform predictive power management by closing one or more contactors based on load predictions for the one or more electric power flows.

2. The power system of claim 1, wherein the power management controller is operable to detect one or more conditions of the at least two energy storage subsystems and configure the one or more electric power flows.

3. The power system of claim 2, wherein the power management controller is operable to configure at least one of the one or more electric power flows from a first energy storage subsystem of the at least two energy storage subsystems to charge a second energy storage subsystem of the at least two energy storage subsystems.

4. The power system of claim 3, wherein the first energy storage subsystem comprises a battery system and a battery management system, the second energy storage subsystem comprises a super/ultra-capacitor, and the bidirectional power converter is operably coupled to the super/ultra-capacitor and the battery management system.

5. The power system of claim 4, wherein the hybrid energy storage system comprises a third energy storage system comprising an isolated battery pack accessible by the power management controller based on determining that a mode of operation of the aircraft is a ground-based mode of operation or an emergency power mode of operation.

6. The power system of claim 1, wherein a plurality of aircraft electrical subsystems is operably coupled to the bidirectional power converter and the power management controller is configured to extract power from or provide power to the aircraft electrical subsystems, and the model predictive control is further based on one or more aircraft subsystem power demands.

7. The power system of claim 6, wherein the aircraft electrical subsystems comprise one or more of an engine subsystem, an aircraft low-voltage DC subsystem, an aircraft high-voltage DC subsystem, and an aircraft AC subsystem.

8. The power system of claim 7, wherein the power management controller is operable to monitor a state of charge of the hybrid energy storage system, a power request of an engine subsystem control of the engine subsystem, an aircraft subsystem control, and the one or more controllers of the electric motor, the first generator, and the second generator.

9. The power system of claim 8, wherein the power management controller is operable to:
determine a current status and constraints from the engine subsystem control, the aircraft subsystem control, and the one or more controllers of the electric motor, the first generator, and the second generator;
receive the engine propulsion power demand and data from a plurality of engine sensors;
determine a plurality of desired values for electrical power levels; and
communicate the desired values for electrical power levels to the engine subsystem control, the aircraft subsystem control, and the one or more controllers of the electric motor, the first generator, and the second generator.

10. The power system of claim 9, wherein the model predictive control determines the electrical power levels by computing a plurality of future step values using a plurality of dynamic equations that model a plurality of subsystems, the current status and constraints, and an objective function based on an error between a requested and an allocation power level or thrust.

11. A method comprising:
interfacing a power management controller with a hybrid energy storage system and one or more controllers of an electric motor, a first generator, and a second generator, wherein the hybrid energy storage system comprises at least two energy storage subsystems each having a different power-energy density and power draw characteristics, and the electric motor and the first generator are coupled to an aircraft engine of a primary power unit and the second generator is coupled to a secondary power unit;
receiving, at the power management controller, an engine propulsion power demand for the aircraft engine; and
performing a model predictive control to dynamically adjust one or more electric power flows through a bidirectional power converter based on the engine propulsion power demand, and perform predictive power management by closing one or more contactors based on load predictions for the one or more electric power flows, wherein the bidirectional power converter is coupled to the hybrid energy storage system and one or more controllers of the electric motor, the first generator, and the second generator.

12. The method of claim 11, further comprising:
detecting one or more conditions of the at least two energy storage subsystems; and
configuring the one or more electric power flows based on the one or more conditions of the at least two energy storage subsystems.

13. The method of claim 12, further comprising:
configuring at least one of the one or more electric power flows from a first energy storage subsystem of the at least two energy storage subsystems to charge a second energy storage subsystem of the at least two energy storage subsystems.

14. The method of claim 13, wherein the first energy storage subsystem comprises a battery system and a battery management system, the second energy storage subsystem comprises a super/ultra-capacitor, and the bidirectional power converter is operably coupled to the super/ultra-capacitor and the battery management system.

15. The method of claim 14, wherein the hybrid energy storage system comprises a third energy storage system comprising an isolated battery pack accessible by the power management controller based on determining that a mode of operation of the aircraft is a ground-based mode of operation or an emergency power mode of operation.

16. The method of claim 11, wherein a plurality of aircraft electrical subsystems is operably coupled to the bidirectional power converter and the power management controller is configured to extract power from or provide power to the aircraft electrical subsystems, and the model predictive control is further based on one or more aircraft subsystem power demands.

17. The method of claim 16, wherein the aircraft electrical subsystems comprise one or more of an engine subsystem, an aircraft low-voltage DC subsystem, an aircraft high-voltage DC subsystem, and an aircraft AC subsystem.

18. The method of claim 17, wherein the power management controller is operable to monitor a state of charge of the hybrid energy storage system, a power request of an engine subsystem control of the engine subsystem, an aircraft subsystem control, and the one or more controllers of the electric motor, the first generator, and the second generator.

19. The method of claim 18, further comprising:
determining a current status and constraints from the engine subsystem control, the aircraft subsystem control, and the one or more controllers of the electric motor, the first generator, and the second generator;

receiving the engine propulsion power demand and data from a plurality of engine sensors;

determining a plurality of desired values for electrical power levels; and communicating the desired values for electrical power levels to the engine subsystem control, the aircraft subsystem control, and the one or more controllers of the electric motor, the first generator, and the second generator.

20. The method of claim 19, further comprising:

determining the electrical power levels by computing a plurality of future step values using a plurality of dynamic equations that model a plurality of subsystems, the current status and constraints, historical energy consumption, and an objective function based on an error between a requested and an allocation power level or thrust.

\* \* \* \* \*